United States Patent
Sayers et al.

(10) Patent No.: US 9,330,121 B2
(45) Date of Patent: May 3, 2016

(54) ELECTRONIC CONTENT INFORMATION DISPLAY MANAGEMENT

(71) Applicant: Hewlett-Packard Development Company, L.P., Houston, TX (US)

(72) Inventors: Craig Peter Sayers, Menlo Park, CA (US); Prakash Reddy, Fremont, CA (US); Jayakumar Suthira, Bangalore (IN)

(73) Assignee: Hewlett-Packard Development Company, L.P., Houston, TX (US)

( * ) Notice: Subject to any disclaimer, the term of this patent is extended or adjusted under 35 U.S.C. 154(b) by 404 days.

(21) Appl. No.: 13/874,271

(22) Filed: Apr. 30, 2013

(65) Prior Publication Data
US 2014/0324803 A1   Oct. 30, 2014

(51) Int. Cl.
*G06F 17/30* (2006.01)
(52) U.S. Cl.
CPC .............................. *G06F 17/30309* (2013.01)
(58) Field of Classification Search
None
See application file for complete search history.

(56) References Cited

U.S. PATENT DOCUMENTS

| 7,814,560 | B2 | 10/2010 | Bellagamba et al. |
| 8,046,387 | B2 | 10/2011 | Nelson |
| 2012/0144302 | A1 | 6/2012 | Campanotti et al. |
| 2013/0212151 | A1* | 8/2013 | Herbach et al. ............... 709/203 |

OTHER PUBLICATIONS

Blandkenship et al., "Professional Team Foundation Server 2012," ISBN:978-1-118-31409-8, Publisher: Wrox, Jan. 2013.*
"Creating a Sharepoint Sequential Workflow Using a Custom Task Approval Field", Jan. 31, 2012.
Carry, B, "Microsoft Sharepoint Products and Technologies Administrator's Pocket Consultant", 2004.

* cited by examiner

*Primary Examiner* — Jay Morrison
(74) *Attorney, Agent, or Firm* — Mannava & Kang, P.C.

(57) ABSTRACT

According to an example, an operation on a version of an electronic content may be performed and a determination as to whether the operation is an editing operation may be made. In response to the operation being an editing operation, a new version may be created and information pertaining to the performance of the operation on the new version may be recorded. In addition, for each significant version, information pertaining to the significant version may be displayed, in which the information may include an identification of the significant version, available operations on the significant version, and a last operation performed on the significant version, in which a significant version may include a version in which no editing operations have been applied or a version in which an operation that is visible to another user has been performed on the version and the operation is outstanding.

14 Claims, 6 Drawing Sheets

ELECTRONIC CONTENT INFORMATION DISPLAY MANAGEMENT

BACKGROUND

There have been an ever increasing number of publishers through which users may upload content to be published. Examples of publishers through which users may upload content to be published include Amazon and Lightning Source. Users may upload different content to different publishers, different versions of the same content to different publishers, may edit versions of the content that were uploaded to different publishers in different manner, etc. As there may be a relatively large number of content and versions of the content, the task of tracking the various versions of the content as well as which of the versions of the content have been uploaded for publishing is known to become relatively onerous.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on.

Disclosed herein are methods and computing apparatuses for managing display of information pertaining to an electronic content. Particularly, the methods and computing apparatuses disclosed herein may determine whether operations performed on the electronic content are significant or insignificant. In this regard, the methods and computing apparatuses disclosed herein may distinguish between significant and insignificant versions of the electronic content and may display the versions differently with respect to each other. In addition, for each significant version of the electronic content for which a significant operation is outstanding, information pertaining to the significant version may be displayed. The information may include an identification of the significant version, available operations on the significant version, and a last operation performed on the significant version. The information may also include depiction of a recommended operation to be performed on the electronic content.

Examples of the electronic content may be an electronic document, such as an article, a book, etc., a source code, machine readable instructions, etc. According to an example, the electronic content includes multiple electronic content and multiple versions of the multiple electronic content may be displayed on the same screen. In one regard, through implementation of the methods and apparatuses disclosed herein, users may upload content through a web portal, may edit the content prior to applying other operations on the content, etc. Each of the operations performed on the content may be tracked and new versions of the content may be created as a result of each editing operation. Each version may be displayed along with any operations and the date at which the operations were performed. The methods and apparatuses disclosed herein therefore enable users to view the current state of their work along with all of the significant versions of a number of different content, such as documents, programs, etc., on a single screen. Users may also directly upload their content to publishers through an interface provided through the methods and apparatuses disclosed herein.

Figure 1:
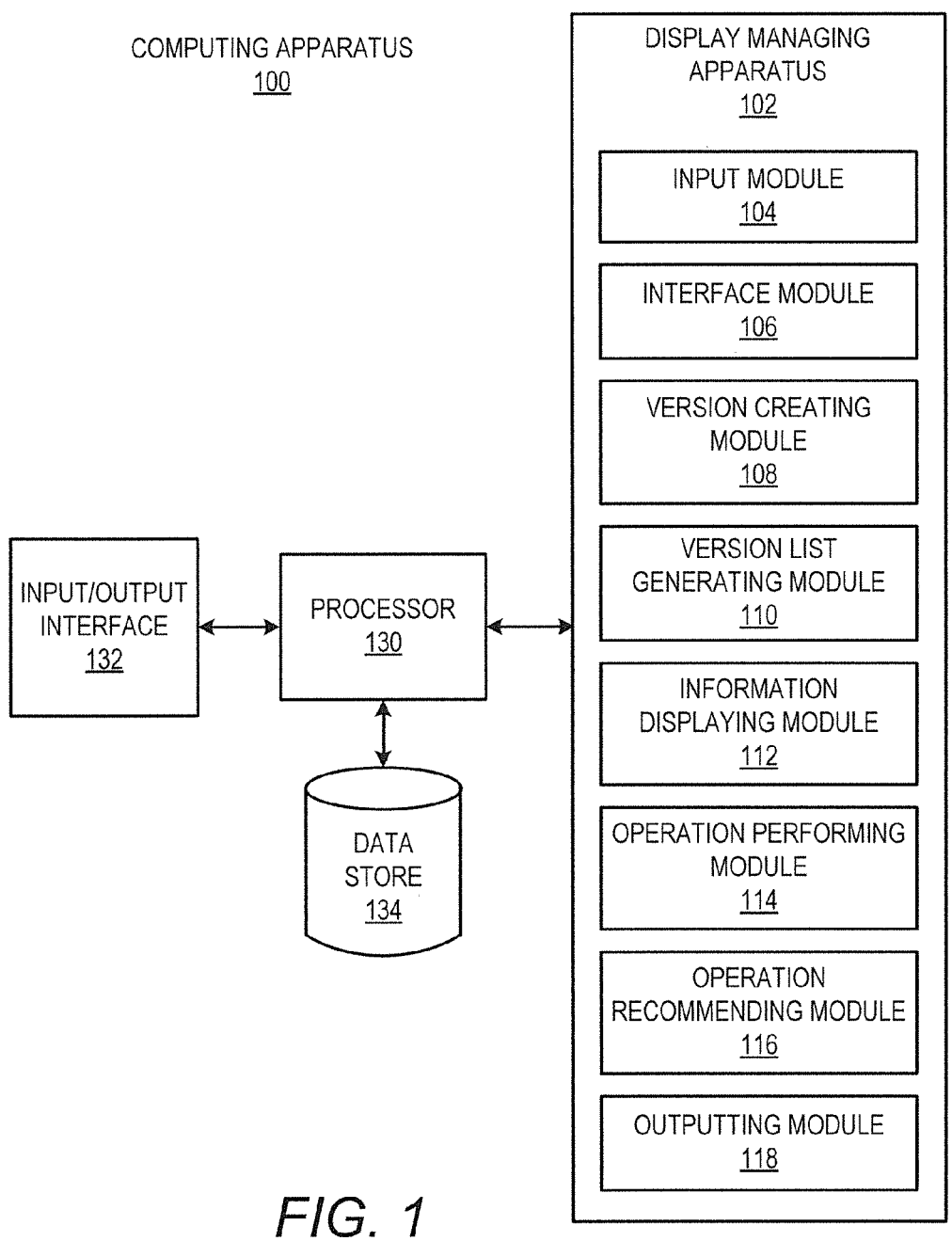
FIG. 1 depicts a simplified block diagram of a computing apparatus, which may implement various features disclosed herein, according to an example of the present disclosure.

With reference first to FIG. 1, there is shown a simplified block diagram of a computing apparatus 100, which may implement various features disclosed herein, according to an example. It should be understood that the computing apparatus 100 may include additional elements and that some of the elements depicted therein may be removed and/or modified without departing from a scope of the computing apparatus 100.

Generally speaking, the computing apparatus 100 may be a desktop computer, a server, a laptop computer, a tablet computer, etc. The computing apparatus 100 is depicted as including a display managing apparatus 102, a processor 130, an input/output interface 132, and a data store 134. The display managing apparatus 102 is also depicted as including an input module 104, an interface module 106, a version creating module 108, a version list generating module 110, an information displaying module 112, an operation performing module 114, an operation recommending module 116, and an outputting module 118.

The processor 130, which may be a microprocessor, a micro-controller, an application specific integrated circuit (ASIC), and the like, is to perform various processing functions in the computing apparatus 100. One of the processing functions may include invoking or implementing the modules 104-118 of the display managing apparatus 102 as discussed in greater detail herein below. According to an example, the display managing apparatus 102 is a hardware device, such as, a circuit or multiple circuits arranged on a board. In this example, the modules 104-118 may be circuit components or individual circuits.

According to another example, the display managing apparatus 102 is a hardware device, for instance, a volatile or non-volatile memory, such as dynamic random access memory (DRAM), electrically erasable programmable read-only memory (EEPROM), magnetoresistive random access memory (MRAM), Memristor, flash memory, floppy disk, a compact disc read only memory (CD-ROM), a digital video disc read only memory (DVD-ROM), or other optical or magnetic media, and the like, on which software may be stored. In this example, the modules 104-118 may be software modules stored in the display managing apparatus 102. According to a further example, the modules 104-118 may be a combination of hardware and software modules.

The processor 130 may store data in the data store 134 and may use the data in implementing the modules 104-118. The data store 134 may be volatile and/or non-volatile memory, such as DRAM, EEPROM, MRAM, phase change RAM (PCRAM), Memristor, flash memory, and the like. In addition, or alternatively, the data store 134 may be a device that may read from and write to a removable media, such as, a floppy disk, a CD-ROM, a DVD-ROM, or other optical or magnetic media.

Figure 2:
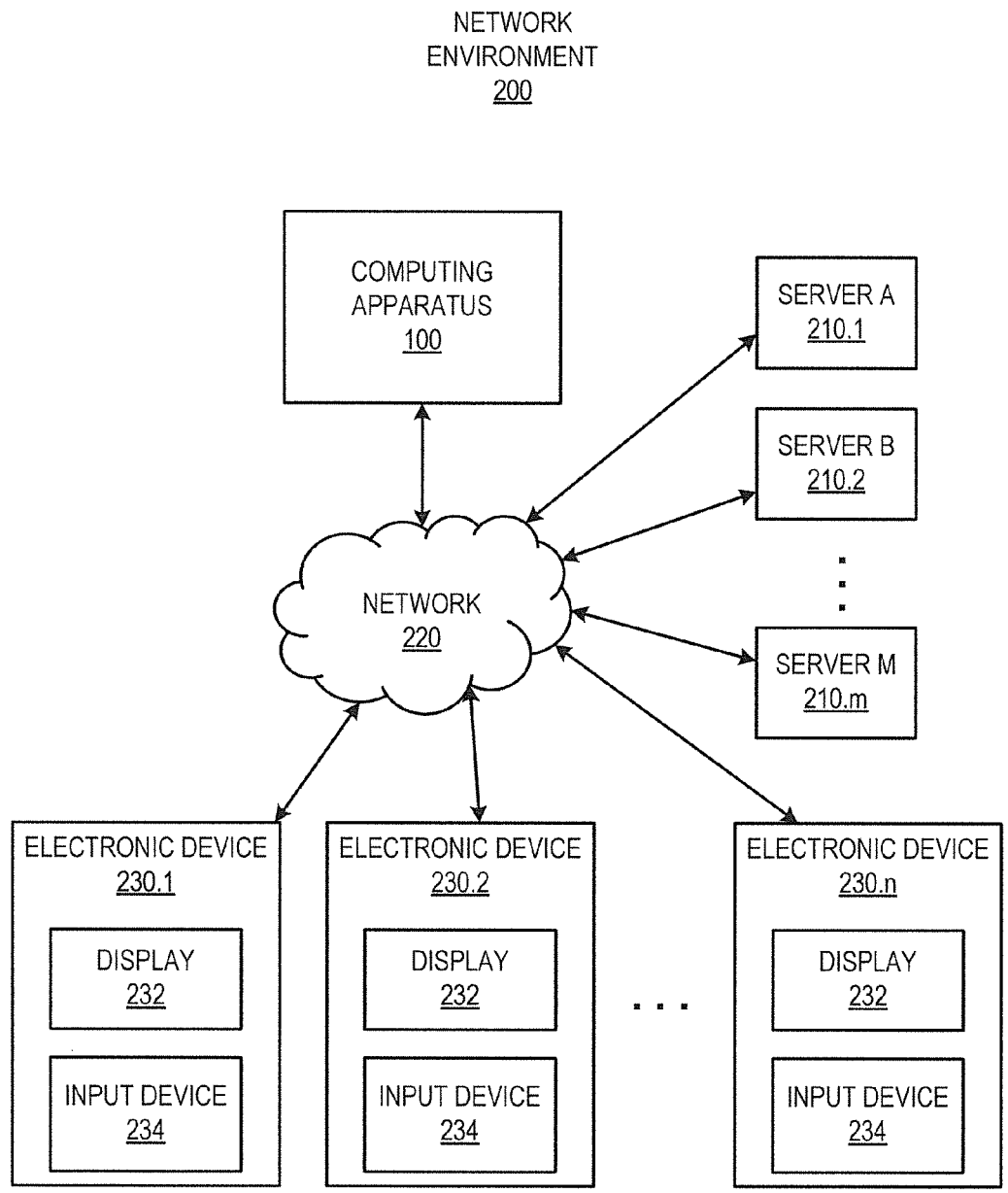
FIG. 2 depicts a simplified block diagram of a network environment including the computing apparatus depicted in FIG. 1, according to an example of the present disclosure.

The input/output interface 132 may include hardware and/or software to enable the processor 130 to communicate with websites over the Internet as well as user electronic devices (shown in FIG. 2). The input/output interface 132 may include hardware and/or software to enable the processor 130 to communicate over a network, such as the Internet, a local area network, a wide area network, a cellular network, etc.

Figure 3:
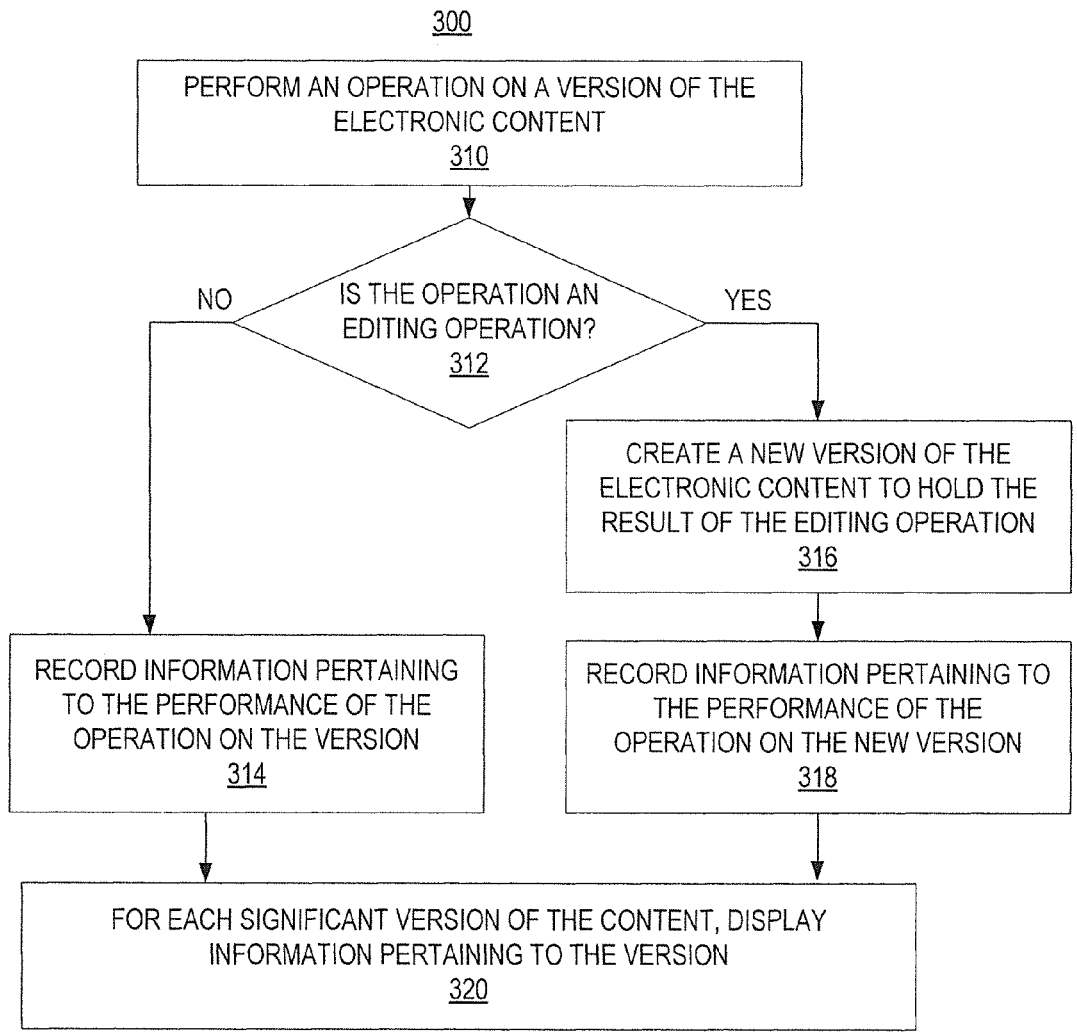
FIG. 3 depicts a flow diagram of a method for managing display of information pertaining to electronic content, according to an example of the present disclosure.
Figure 4:
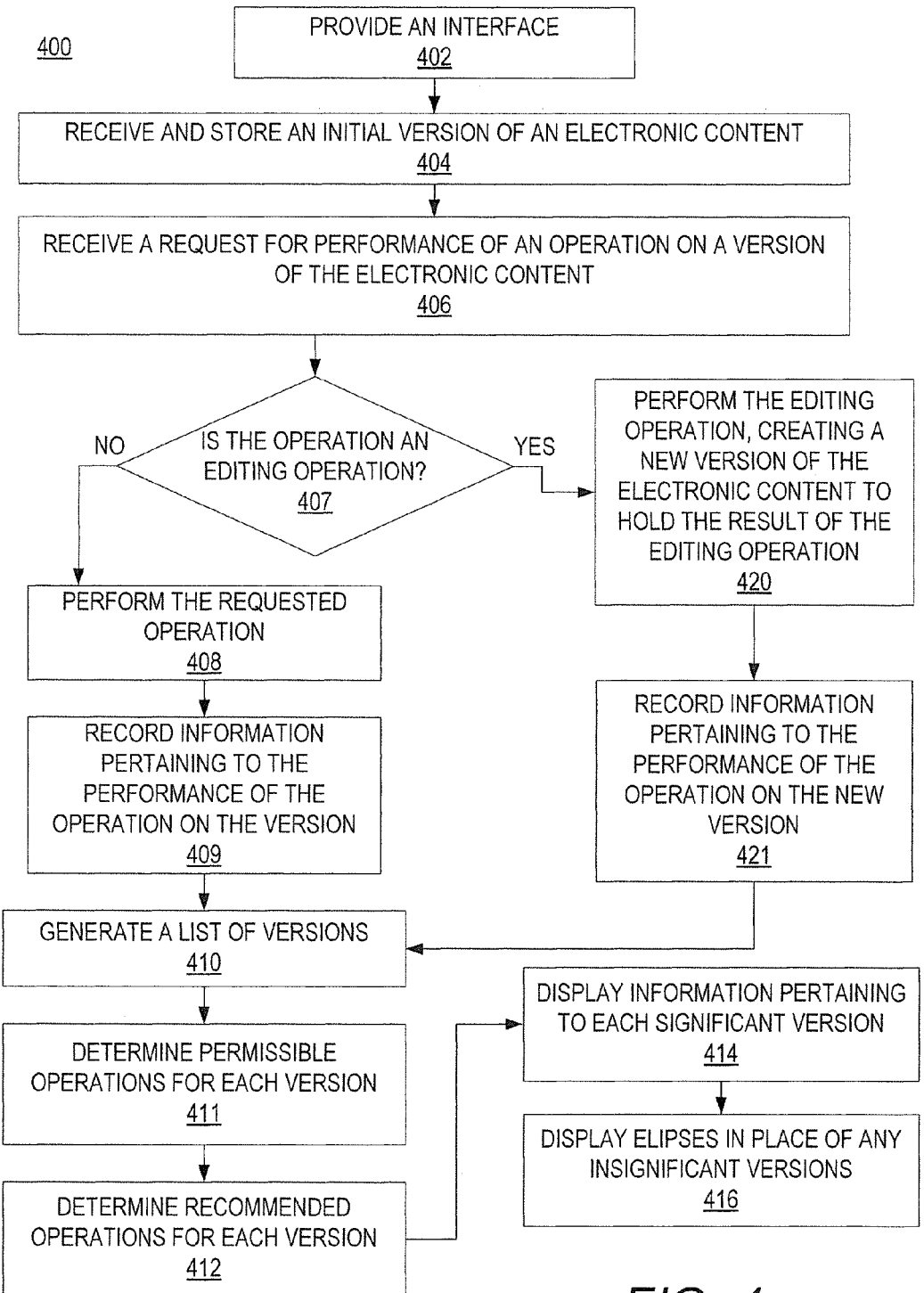
FIG. 4 depicts a flow diagram of a method for managing display of information pertaining to electronic content, according to another example of the present disclosure.

Various manners in which the display managing apparatus 102 in general and the modules 104-118 in particular may be implemented are discussed in greater detail with respect to the methods 300 and 400 depicted in FIGS. 3 and 4. Prior to discussion of the methods 300 and 400, however, reference is made to FIG. 2, in which is shown a simplified block diagram of a network environment 200 including the computing apparatus 100 depicted in FIG. 1, according to an example. It should be understood that the network environment 200 may include additional elements and that some of the elements depicted therein may be removed and/or modified without departing from a scope of the network environment 200.

According to an example, the computing apparatus 100 is also to provide an interface through which users may upload electronic content, edit the electronic content, and perform other operations on the electronic content. In one regard, the computing apparatus 100 enables users to view different versions of their content as well as various states of their content through the interface. As discussed in greater detail herein below, the different versions of the content may be significant or insignificant versions depending upon the types of operations performed on the content. For instance, a version of the content may be considered to be a significant version if the operation performed on the content is visible to another user. An administrator of the computing apparatus 100 may set the various operations as being either significant or insignificant and these settings may be stored in the data store 134.

In any regard, the computing apparatus 110 may provide the interface to enable users to quickly and easily distinguish the significant versions of the content from the insignificant versions, as well as to easily discover other information pertaining to the content. Users may also access the interface to determine various states of their content, such as when the content was last edited, when the content was last uploaded to a publishing website, to which publishing website the content was uploaded, etc. According to an example in which the content is content to be published, such as an article, a book, etc., the interface may contain links to multiple publishing websites such that users may automatically upload desired versions of their content to the publishing websites by selecting the links. The interface may also visually indicate which version of the content was uploaded to which of the publishing websites. In addition, users may manage a plurality of different content through interaction with the display managing apparatus 102.

As shown in FIG. 2, users may access the computing apparatus 100 through electronic devices 230.1-230.$n$, in which the variable "n" denotes an integer greater than one. The electronic devices 230.1-230.$n$ may be any of, for instance, laptop computers, tablet computers, personal digital assistants, cellular telephones, desktop computers, etc. Thus, for instance, a user may communicate with the display managing apparatus 102 in the computing apparatus 100 to manage their content. In any regard, users may interact with the display managing apparatus 102 through input devices 234, which may be keyboards, mice, touchscreens, etc., of the electronic devices 230.1-230.$n$. In one regard, therefore, users may manage, e.g., review, edit, publish, etc., content uploaded to the display managing apparatus 102 through their respective electronic devices 230.1-230.$n$.

The computing apparatus 100 may also access various servers 210.1-210.$m$, in which the variable "m" denotes an integer greater than one. The various servers 210.1-210.$m$ may be servers that host various websites, such as publishing websites, collaborative work websites, etc. In any regard, the network 220 may be any of the Internet, a local area network, a wide area network, a cellular network, etc. By way of example, the computing apparatus 100 may provide the interface as a webpage that is displayed on the respective displays 232 of the electronic devices 230.1-230.$n$.

Turning now to FIG. 3, there is shown a flow diagram of a method 300 for managing display of information pertaining to electronic content, according to an example. It should be apparent to those of ordinary skill in the art that the method 300 represents a generalized illustration and that other operations may be added or existing operations may be removed, modified, or rearranged without departing from a scope of the method 300. Although particular reference is made to the computing apparatus 100 depicted in FIGS. 1 and 2 as being an apparatus that may implement the operations described in the method 300, it should be understood that the method 300 may be performed in differently configured apparatuses without departing from a scope of the method 300.

At block 310, an operation may be performed on a version of the electronic content, for instance, by the operation performing module 114. Some operations may be editing operations, that is operations which have been predefined as making a significant change to the version of the electronic content. According to an example, operations like downloading and changing the creation date of a document would not be editing operations since they do not alter the result a user would see if the electronic content were to be published, while changing the publishable content of a version would be an editing operation since it would be visible to another user if the version were later to be published. Separately from the editing determination, some operations may be significant operations. According to an example, an operation is a significant operation if the operation is visible to another user. Thus, for instance, an operation in which the electronic content is previewed or edited may be an insignificant operation; whereas, an operation in which the electronic content is uploaded to a publishing website or to a database that is accessible to other users may be a significant operation. In any regard, the determination as to which operations are editing operations and which operations are not editing operations, and also the separate determination of which operations are significant operations and which operations are insignificant operations may have been previously determined, for instance, by an administrator of the computing apparatus 100 and may have been stored in the data store 134.

According to an example, at block 312, the version creating module 108 may determine whether the operation performed on the electronic content is an editing operation and, if so, may generate a new version of the electronic content to hold the result of the editing operation, as indicated at block 316.

The version creating module 108 may make this determination by accessing information contained in the data store 134 pertaining which operations are to be considered to be editing operations. The version creating module 108 may also identify the new version as merely a new version and identify previous versions of the electronic content as old versions. In addition, or alternatively, the version creating module 108 may identify the new version with a version number that is monotonically increased. In addition, at block 318, information pertaining to the performance of the editing operation on the new version may be recorded. This information may include, for example the user who performed the operation, the date the operation was performed, etc.

In response to a determination that the operation is a non-editing operation at block 312, information pertaining to the performance of the operation on the version may be recorded as indicated at block 314.

At block 320, following either of blocks 314 and 318, for each significant version of the electronic content, information pertaining to the significant version may be displayed in an interface, for instance, on the display 232 of a user's electronic device 230.1. A version of the electronic content may be significant if it is new, having not had any editing operations applied to it. In addition, a version of the electronic content may also be significant if a significant operation has previously been performed on it, and if that significant operation is still outstanding. A significant operation may be considered to be outstanding if the significant operation has not been "undone" by a later operation. In any regard, the information displaying module 112 may display information pertaining to the significant version of the electronic content, in which the information may include an identification of the significant version (e.g., a version number, whether the version is a new version, etc.), available operations on the significant version, operations performed on the significant version, the date of the last performance of each operation, etc. Examples of additional information that may be displayed as well as various characteristics of the displayed information are discussed in further detail herein below.

Turning now to FIG. 4, there is shown a flow diagram of a method 400 for managing display of information pertaining to electronic content, according to another example. It should be apparent to those of ordinary skill in the art that the method 400 represents a generalized illustration and that other operations may be added or existing operations may be removed, modified, or rearranged without departing from a scope of the method 400. Although particular reference is made to the computing apparatus 100 depicted in FIGS. 1 and 2 as being an apparatus that may implement the operations described in the method 400, it should be understood that the method 400 may be performed in differently configured apparatuses without departing from a scope of the method 400.

At block 402, an interface may be provided to a user. For instance, a user may access the interface module 106 through the network 220, such as through the Internet, and the interface module 106 may cause the interface to be displayed on a display 232 of the user's electronic device 230.1. The interface may be a webpage or other portal through which users may discover the scripts contained in the catalog of scripts 140. By way of example, the interface module 106 may display an interface on the display 232 of a user's electronic device 230.1 through which a user may upload electronic content and perform operations on the uploaded electronic content.

Figure 5:
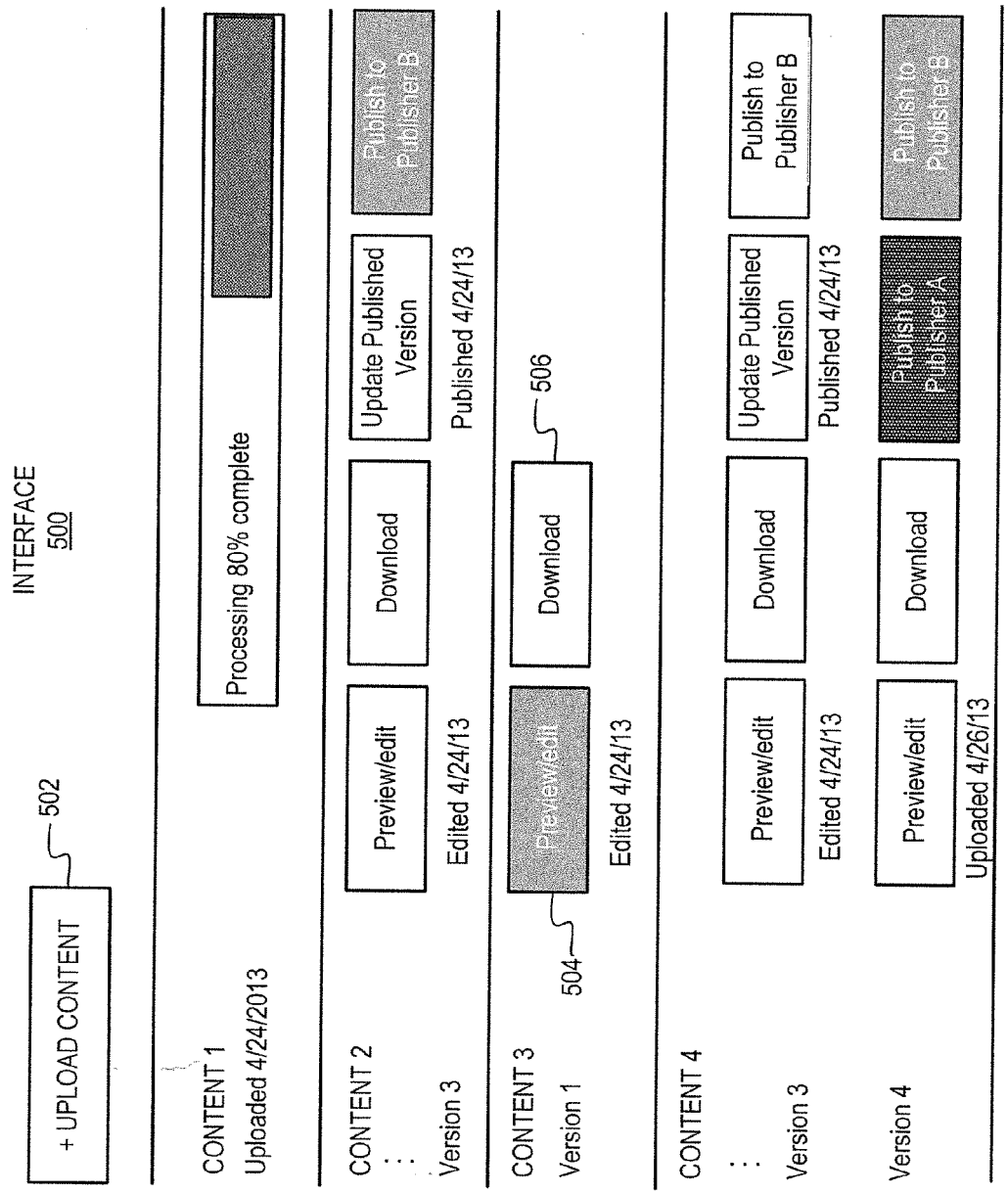
FIG. 5 depicts a simplified example of an interface, according to an example of the present disclosure.

A simplified example of an interface 500 is depicted in FIG. 5. It should be clearly understood that the interface 500 depicted in FIG. 5 is for purposes of illustration only and should thus not be construed as limiting the method or computing apparatus 100 disclosed herein. Particularly, the interface 500 depicts an example in which the electronic content includes a plurality of electronic documents listed as content 1, content 2, content 3, and content 4 that may be uploaded to a publisher, such as Amazon, Lightning Source, etc. In addition, each of the versions of the contents may respectively be arranged according to the date of their most-recent operation. Although the versions of the content have been depicted as increasing monotonically, it should be understood that one of the modifications to the interface may include depicting the versions in a tree structure arrangement. That is, for instance, multiple new versions may originate from the same older version. In addition, although particular reference is made in the interface 500 to the content being a document to be published, it should be clearly understood that the interface 1500 may similar depict versions of other types of content, such as software modules.

As shown in FIG. 5, the interface 500 may include a plurality of buttons that a user may activate to cause various operations to be performed on various electronic content. For instance, the interface 500 includes a button 502 that a user may activate to upload content.

With reference back to FIG. 4, an initial version of an electronic content may be received through the input module 104 and may be stored in the data store 134, for instance as indicated at block 404. Thus, for instance, a user may activate the button 502 for uploading content and the interface 500 may facilitate uploading of the content. For instance, activation of the button 502 may cause a folder to be opened into which a user may copy a desired content.

In addition, an entry into the interface 500 may be created for the uploaded content as shown, for instance, with respect to "Content 1". "Content 1" in the interface 500 is depicted as being in the process of being uploaded. Moreover, various buttons denoting operations that are available to be performed with respect to the uploaded content may be displayed with respect to the uploaded content. As shown in FIG. 5, the buttons may include a "Preview/edit" button 504 and a "Download" button 506.

At block 406, a request for performance of an operation on a version of the electronic content may be received. For instance, the user may select to activate one of the buttons displayed on the interface 500 and the user's selection may be received through the interface module 106.

At block 407, the operation may be classified as either an editing operation or not an editing operation. If the operation is an editing operation, the operation may be performed and a new version may be created as indicated at block 420. In addition, the information pertaining to the performance of the operation on the new version may be recorded as indicated at block 421.

If the operation is not an editing operation, the operation may be performed as indicated at block 408, and information pertaining to the performance of the operation may be recorded as indicated at block 409. For instance, the interface module 106 may perform and/or facilitate performance of the requested operation by the user. By way of example, the interface module 106 may facilitate editing of content by a user. In addition, a new version of the content may be created and stored. An identifier of the new version may also be shown in the interface 500. For instance, the originally uploaded version of the content may be labeled as version 1 and the new version of the content may be labeled as version 2. Alternatively, when the new version is created, a previous version may be labeled as an "old version" and the new version may be labeled as a "new version."

At block 410, a list of versions may be generated. For instance, the version list generating module 110 may generate a list of versions for each of the content, in which each of the versions is either a significant version or an insignificant version of the content. By way of example, and with particular reference to "Content 4" in FIG. 5, the version list generating module 110 may generate a list of versions that includes each of versions 1-4. In addition, versions 3 and 4 are depicted as being significant versions and versions 1 and 2 are depicted with ellipses and are thus depicted as being insignificant versions for reasons discussed below.

At block 411 a set of permissible operations pertaining to each version of the content may be generated. The permissible operations are those that are possible given past operations performed on the content. The determination of which operations are permissible on a version of the content given recorded information on past operations on the version of the content and past operations on other versions of the same content may have been previously determined, for example by an administrator of the computing apparatus 100, and may have been stored in the data store 134.

At block 412, a set of recommended operations pertaining to a version of a content may be determined from the set of permissible operations. For instance, the operation recommending module 116 may be programmed with instructions to recommend particular operations on the content based upon a previous operation that was performed on the content. By way of example, and with particular reference to "Content 4" in FIG. 5, the operation recommending module 116 may determine that a recommendation should be made to publish "version 4" to publisher B since version 3 has already been published to publisher A. In addition, the operation recommending module 116 may determine that a warning should be shown with respect to the button for publishing version 4 to publisher A since version 3 was already published to publisher A.

At block 414, information pertaining to each significant version may be displayed. For instance, the information displaying module 112 may display an identification of the significant version, permissible operations on the significant version, and operations previously performed on the significant version. In addition, the information displaying module 112 may display any recommended permissible operations in a highlighted manner. For instance, the information displaying module 112 may display a button corresponding to a recommended operation in a color that differs from the other buttons that do not correspond to a recommended operation. By way of particular example, and with reference to "Content 4" in FIG. 5, the information displaying module 112 may display the "publish to publisher B" button in a color that differs from the "preview/edit" and "download" buttons. In addition, in response to selection of the button to publish the content to publish B, the outputting module 118 may upload that version of the content to the publisher B. Moreover, with reference to "Content 4" in FIG. 5, the information displaying module 112 may display the "publish to publisher A" button in a color that differs from the other buttons to warn a user that a previous version of the content has been published to that publisher. In this way the system may show the user which operations have already been performed, which are permissible, and which are recommended, for each version of each content.

At block 416, ellipses may be displayed in place of any sequence of one or more insignificant versions in the generated list of versions. For instance, the information display module 112 may determine which of the versions in the generated list of versions are insignificant versions and may display those versions as ellipses. In addition, the ellipses may be links to view the insignificant versions. That is, selection of the ellipses may result in the insignificant versions, along with their corresponding information, to be displayed. An example in which versions 1 and 2 have been replaced with ellipses is shown with respect to "Content 4" in FIG. 5.

According to an example, the methods and apparatuses disclosed herein generally provide users with the ability to quickly view significant versions of electronic content, while still having access to view insignificant versions of the electronic content. In addition, users may view multiple content and the operations performed in the various versions of the multiple content in a single screen. As such, users may relatively easily track the statuses of their content, perform various operations on their content, and track multiple versions of their content. Users may also see which operations have been performed, and which have not been performed.

Some or all of the operations set forth in the methods 300 and 400 may be contained as a utility, program, or subprogram, in any desired computer accessible medium. In addition, the methods 300 and 400 may be embodied by computer programs, which may exist in a variety of forms both active and inactive. For example, they may exist as machine readable instructions, including source code, object code, executable code or other formats. Any of the above may be embodied on a non-transitory computer readable storage medium.

Examples of non-transitory computer readable storage media include conventional computer system RAM, ROM, EPROM, EEPROM, and magnetic or optical disks or tapes. It is therefore to be understood that any electronic device capable of executing the above-described functions may perform those functions enumerated above.

Figure 6:
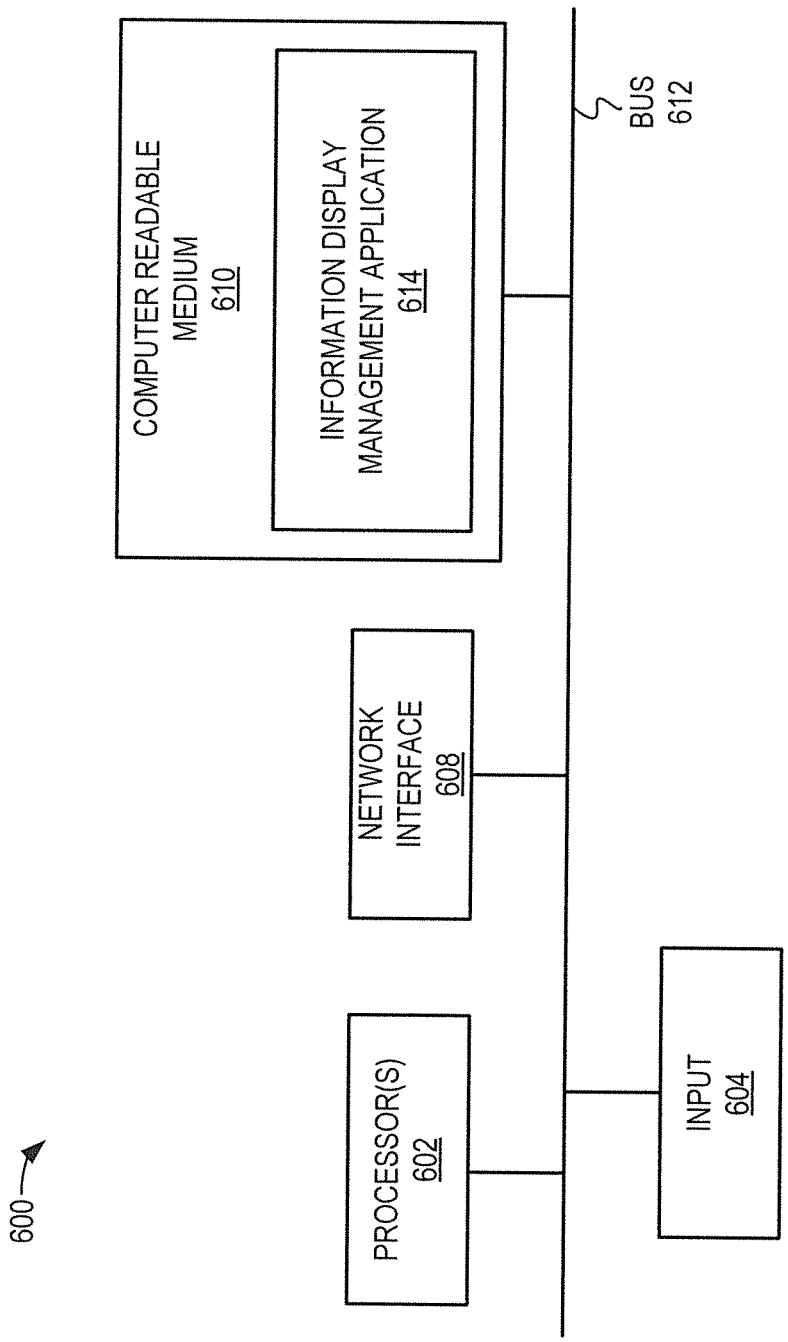
FIG. 6 illustrates a schematic representation of an electronic device, which may be employed to perform various functions of the computing apparatus depicted in FIGS. 1 and 2, according to an example of the present disclosure.

Turning now to FIG. 6, there is shown a schematic representation of an electronic device 600, which may be employed to perform various functions of the computing apparatus 100 depicted in FIGS. 1 and 2, according to an example. The device 600 may include a processor 602, an input 604; a network interface 608, such as a Local Area Network LAN, a wireless 802.11x LAN, a 3G mobile WAN or a WiMax WAN; and a computer-readable medium 610. Each of these components may be operatively coupled to a bus 612.

The computer readable medium 610 may be any suitable medium that participates in providing instructions to the processor 602 for execution. For example, the computer readable medium 610 may be non-volatile media, such as an optical or a magnetic disk; volatile media, such as memory. The computer-readable medium 610 may also store an information display management application 614, which may perform the methods 300 and 400 and may include the modules of the display management apparatus 102 depicted in FIG. 1. In this regard, the information display management application 614 may include an input module 104, an interface module 106, a version creating module 108, a version list generating module 110, an information displaying module 112, an operation performing module 114, an operation recommending module 116, and an outputting module 118.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example of the disclosure along with some of its variations. The terms, descriptions and figures used herein are set forth by way of illustration only and are not meant as limitations.

Many variations are possible within the spirit and scope of the disclosure, which is intended to be defined by the following claims—and their equivalents—in which all terms are meant in their broadest reasonable sense unless otherwise indicated.

What is claimed is:

1. A method for managing display of information pertaining to electronic content, said method comprising:
performing, by a processor, an operation on a version of the electronic content,
determining whether the operation is an editing operation;
in response to the operation being an editing operation, creating a new version of the electronic content; and recording information pertaining to the performance of the operation on the new version; and
for each significant version of the electronic content, displaying information pertaining to the significant version comprising an identification of the significant version, available operations on the significant version, and a last operation performed on the significant version, wherein a significant version of the electronic content comprises a version in which no editing operations have been applied or a version in which an operation that is visible to another user has been performed on the version and the operation is outstanding;
generating a list of versions of the electronic content; and
in response to an insignificant version of the electronic content preceding a significant version of the electronic content in the generated list, displaying ellipses in place of the insignificant version, wherein the ellipses are a link to view the insignificant version.

2. The method according to claim 1, further comprising:
in response to the operation not being an editing operation;
recording information pertaining to performance of the non-editing operation on the version of the electronic content.

3. The method according to claim 1, further comprising:
providing a web-based portal; and
receiving the electronic content through the web-based portal.

4. The method according to claim 1, further comprising:
determining a permissible operation for each version of the electronic content;
determining a recommended operation pertaining to a significant version of the electronic content; and
wherein displaying information pertaining to the significant version further comprises displaying the recommended operation for the significant version in a highlighted manner.

5. The method according to claim 4, further comprising:
displaying a plurality of buttons corresponding to operations that, when activated, are to perform an operation on the electronic content, wherein the buttons are depicted in different colors to indicate whether operations corresponding to the buttons are recommended for each of the versions of the electronic content; and
displaying a date when the button was last activated.

6. The method according to claim 1, wherein displaying information pertaining to the significant version further comprises displaying a warning pertaining to an outstanding operation on an older version of the electronic content.

7. The method according to claim 1, further comprising:
displaying an identifier of another electronic content; and
displaying information pertaining to a significant version of the another electronic content comprising an identification of the significant version of the another electronic content, available operations on the significant version of the another electronic content, and a last operation performed on the another electronic content.

8. The method according to claim 1, wherein the electronic content comprises content to be published through a web-based publisher, and wherein displaying information pertaining to the significant version further comprises displaying a button that, when activated, causes the significant version of the content to be published to the web-based publisher.

9. The method according to claim 8, further comprising:
displaying the button to have a first color;
receiving an indication of activation of the button;
uploading the content to the web-based publisher; and
displaying the button to have a second color that is different from the first color to indicate that the content has been published to the web-based publisher.

10. The method according to claim 1, wherein the electronic content comprises a work to be published through a first web-based publisher and a second web-based publisher, and wherein displaying information pertaining to the significant version further comprises displaying a first button that, when activated, causes the content to be published to the first web-based publisher and a second button that, when activated, causes the content to be published to the second web-based publisher.

11. An apparatus to manage display of information pertaining to electronic content, said apparatus comprising:
a processor;
a memory on which is stored machine readable instructions that cause the processor to:
perform an operation on a version of the electronic content;
determine that the operation is an editing operation;
create a new version of the electronic content to hold the result of the editing operation;
record information pertaining to the performance of the operation on the new version;
generate a list of versions of the electronic content;
for each significant version of the electronic content, display information pertaining to the significant version comprising an identification of the significant version, available operations on the significant version, and a last operation performed on the significant version; and
in response to an insignificant version of the electronic content preceding a significant version of the electronic content in the generated list, display ellipses in place of the insignificant version, wherein the ellipses are a link to view the insignificant version.

12. The apparatus according to claim 11, wherein the machine readable instructions further cause the processor to:
determine a permissible operation for a significant version of the electronic content;
determine a recommended operation pertaining to the significant version of the electronic content; and
display the recommended operation in a highlighted manner.

13. A non-transitory computer readable storage medium on which is stored machine readable instructions that when executed by a processor are to cause the processor to:
perform an operation on a version of the electronic content;
determine that the operation is an editing operation;
create a new version of the electronic content to hold the result of the editing operation;
record information pertaining to the performance of the operation on the new version;
for each significant version of the electronic content for which a significant operation is outstanding, display information pertaining to the significant version comprising an identification of the significant version, available operations on the significant version, and a last operation performed on the significant version;

generate a list of versions of the electronic content; and in response to an insignificant version of the electronic content preceding a significant version of the electronic content in the generated list, display ellipses in place of the insignificant version, wherein the ellipses are a link to view the insignificant version.

14. The non-transitory computer readable storage medium according to claim 13, wherein the machine readable instructions are further to cause the processor to:

determine a permissible operation for a significant version of the electronic content;

determine a recommended operation pertaining to the significant version of the electronic content; and display the recommended operation in a highlighted manner.

* * * * *